United States Patent [19]

Kondo

[11] 4,001,851
[45] Jan. 4, 1977

[54] GAS PRESSURE DEVICE FOR DRIVING OPERATING MEANS IN A CAMERA

[75] Inventor: Toshihiro Kondo, Tokyo, Japan

[73] Assignees: Toshihiro Kondo, Tokyo; Fuji Photo Film Co., Ltd., both of Japan

[22] Filed: Oct. 16, 1975

[21] Appl. No.: 622,853

[30] Foreign Application Priority Data

Oct. 16, 1974 Japan .................. 49-119047
Oct. 16, 1974 Japan .................. 49-119046

[52] U.S. Cl. .................. 354/266; 354/202; 354/288; 354/295
[51] Int. Cl.² .................. G03B 17/00
[58] Field of Search .......... 354/266, 202, 288, 295, 354/354

[56] References Cited

UNITED STATES PATENTS

| | | | |
|---|---|---|---|
| 2,699,102 | 1/1955 | Doyle et al. | 354/266 |
| 2,837,017 | 6/1958 | Hough | 354/266 |
| 2,874,625 | 2/1959 | Thalhammer | 354/266 |

FOREIGN PATENTS OR APPLICATIONS 37-17738  10/1961  Japan .................. 354/266

*Primary Examiner*—Joseph F. Peters, Jr.
*Attorney, Agent, or Firm*—Gerald J. Ferguson, Jr.; Joseph J. Baker

[57] ABSTRACT

Gas pressure is used for driving such operating members in a camera as a mirror swing up lever, a diaphragm control lever and a shutter operating mechanism. A gas cylinder containing a liquefied gas is connected with a cylinder having a piston by way of a flow control valve. The piston is connected with an operating member in the camera. In a preferred embodiment of the invention, a pressure regulating valve is provided between the gas cylinder and a subtank for storing vaporized gas at a room temperature to effect accurate control of operating members by the gas having a constant pressure.

20 Claims, 12 Drawing Figures

GAS PRESSURE DEVICE FOR DRIVING OPERATING MEANS IN A CAMERA

BACKGROUND OF THE INVENTION

1. Field of the Invention

This invention relates to a device for driving several operating means in a predetermined sequence in a photographic camera, and more particularly to a sequential driving device driven by use of gas pressure adapted to be used in a camera or the like for driving several operating means in a predetermined sequence.

2. Despcription of the Prior Art

In cameras it is common for various operating means such as a shutter button, a mirror, a photometric means, diaphragm controlling means, shutter blade controlling means and so forth to be driven in a predetermined sequence so that one means may be driven after another. Since in the conventional cameras these means are driven by the force of springs which are charged upon winding up of the film in the camera, a complicated mechanism is necessitated to interconnect these means with each other to effect the predetermined sequential operation. This results in enlargement of the size of the camera body. Further, it has also been known in the art to drive various operating means by use of electric driving means. In this type of camera, a mercury cell is usually loaded in the camera. The mercury cell is expensive, and accordingly, the camera employing an electric driving means is economically disadvantageous.

SUMMARY OF THE INVENTION

In view of the above described defects inherent in the conventional cameras, it is the primary object of the present invention to provide a driving device which is capable of driving several operating means in accordance with a predetermined sequence without using mechanical or electrical interconnecting and driving means.

A more specific object of the present invention is to provide a driving device for a camera which drives operating means by use of gas pressure.

Another object of the present invention is to provide a driving device for a camera which drives various operating means in a predetermined sequence.

Still another object of the present invention is to provide a driving device for a camera which drives various camera operating means in a predetermined sequence wherein the time intervals between operations of several operating means are made controllable.

A further object of the present invention is to provide a driving device for a camera by use of gas pressure wherein the pressure of the gas is controlled to be constant to effect accurate control or driving of various operating means.

A still further object of the present invention is to provide a driving device for a camera by use of gas pressure wherein the gas pressure is controlled to effectively drive the operating means.

A still further object of the present invention is to provide a driving device for a camera by use of gas pressure wherein the temperature of the gas to be used for driving operating means is maintained at a proper value.

In order to accomplish the above objects of the present invention, the device in accordance with this invention comprises a gas pressure supply means such as a gas cylinder or a pump and a gas pressure actuated operating means such as a combination of a cylinder and a piston, a diaphragm or bellows connected with the supply means. The gas pressure actuated operating means converts the gas pressure into a movement in one direction. In order that several operating means may be sequentially driven, several operating means are connected in series or flow control means are disposed between adjacent operating means connected in parallel.

In a variation of the device in accordance with the present invention, a storage tank is disposed between a main gas supply cylinder and the gas pressure actuated operating means with a pressure regulating valve provided therebetween to make the pressure of the gas to be used for actuating the operating means constant to effect accurate control of the operating means. By the provision of the storage tank, the reduction of gas pressure by vaporization is prevented and accordingly the gas is effectively used. The pressure regulating valve is normally closed by a spring force and is opened to supply the gas within the main gas cylinder to the storage tank when the pressure within the tank becomes lower than the pressure within the main gas cylinder.

DESCRIPTION OF PREFFERED EMBODIMENTS

Figure 1:
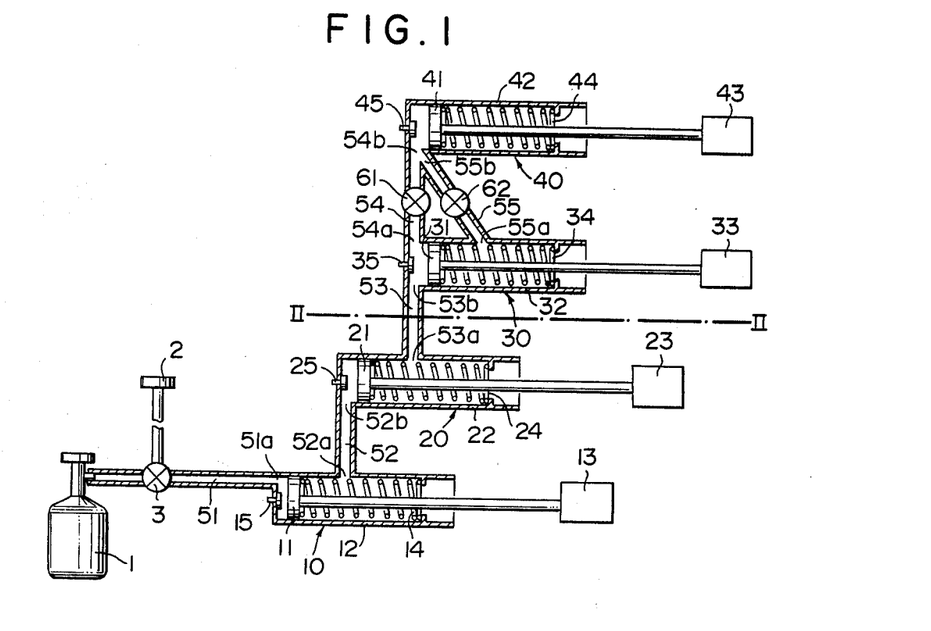
FIG. 1 is a longitudinal sectional view showing one embodiment of the present invention in which four operating means are driven by gas pressure.

The embodiment of the driving device in accordance with the present invention illustrated in FIG. 1 comprises a gas pressure supply means 1 such as a gas cylinder containing compressed gas, a gas supply valve 3 actuated by a depression button 2, and four sets of operating means each comprising a piston and a cylinder. The operating means are comprised of first, second, third and fourth operating means 10, 20, 30 and 40 respectively comprising first, second, third and fourth pistons 11, 21, 31 and 41 and first, second, third and fourth cylinders 12, 22, 32 and 42. The four operating means 10, 20, 30 and 40 are used for swinging up a mirror, controlling a diaphragm, opening a shutter and closing a shutter respectively.

The gas supply means 1 and the first cylinder 12 are communicated with each other by way of a pipe 51. The first cylinder 12 and the second cylinder 22 are communicated with each other by a pipe 52. The second cylinder 22 and the third cylinder 32 are communicated with each other by a pipe 53. The third cylinder 32 and the fourth cylinder 42 are communicated with each other by way of two pipes 54 and 55 provided with flow control valves 61 and 62, respectively. One end 51a of the pipe 51 is open at the head of the first cylinder 12. One end 52a of the pipe 52 is open at a side of the first cylinder 12 and the other end 52b thereof is open at the head of the second cylinder 22. One end 53a of the pipe 53 is open at a side of the second cylinder 22 and the other end 53b thereof is open at the head of the third cylinder 32. One end 54a of the pipe 54 is open at the head of the third cylinder 32 and the other end 54b is open at the head of the fourth cylinder 42, and one end 55a of the pipe 55 is open at a side of the third cylinder 32 and the other end 55b is open at the head of the fourth cylinder 42.

The piston head of the first piston 11 is fixed to a lever 13 which is interconnected with a mirror swing up means such as a member to disengage a hook pin which holds a spring for swinging up a mirror. Similarly, the piston heads of the second, third and fourth pistons 21, 31 and 41 are fixed to levers 23, 33 and 43 for operating a diaphragm for controlling the aperture size, a leading shutter blind and a trailing shutter blind, respectively.

Within the cylinders 12, 22, 32 and 42, compression springs 14, 24, 34 and 44 are provided for spring urging the piston heads leftward. These springs are compressed to allow the rightward movement of the piston heads when gas pressure is supplied into the cylinders 12, 22, 32 and 42 from the left side. The cylinders 12, 22, 32 and 42 are provided with outlet valves 15, 25, 35 and 45 in the heads thereof respectively so that the gas within the cylinders may be forwarded out of the cylinders after the operation of the operating means 10, 20, 30 and 40 is completed. As the gas within the cylinders is pushed out of the cylinders, the piston heads are returned to their initial position by means of the compression springs and the outlet valves are closed by the returned piston heads.

In operation of the above described embodiment of the present invention, the gas within the gas cylinder 1 is released into the first cylinder 12 through the pipe 51 by depressing the button 2 to open the valve 3. The pressure of the gas moves the piston 11 of the first operating means 10 to the right overcoming the spring force of the spring 14. The piston 11 operates the lever 13 to swing up the mirror in the camera. When the piston head of the first piston 11 comes to the position of the opening of one end 52a of the pipe 52, the gas starts to flow into the second cylinder 22 and then the second piston 21 is moved to the right. By the movement of the second piston 21, the second lever 23 for operating the diaphragm is operated to control the aperture size. When the second piston 21 comes to the position of the opening of the end 53a of the pipe 53, the gas within the second cylinder starts to flow into the third cylinder 32 by way of the pipe 53 and the third piston 31 starts to move to the right to operate the lever 33 and open the shutter. The gas within the third cylinder 32 flows into the fourth cylinder 42 by way of the pipe 54 of the pipe 55. The relation between the third and fourth operating means 30 and 40 pertains to a shutter operation and will be described in detail with reference to FIGS. 2 and 3.

Figure 2:
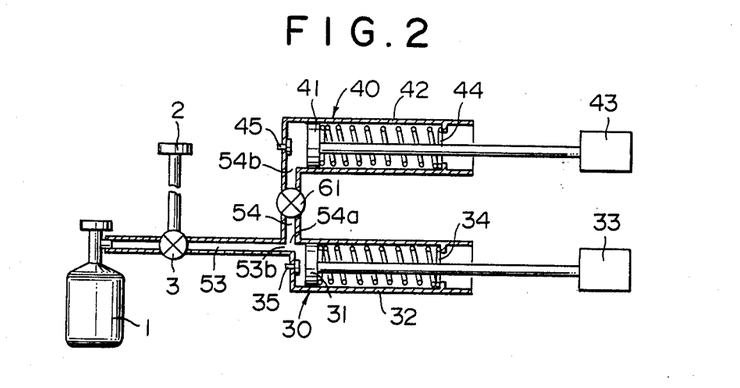
FIGS. 2 and 3 are longitudinal sectional view for explaining the basic construction of the shutter operating portion of the device in which two operating means are driven with a controlled time interval.
Figure 3:
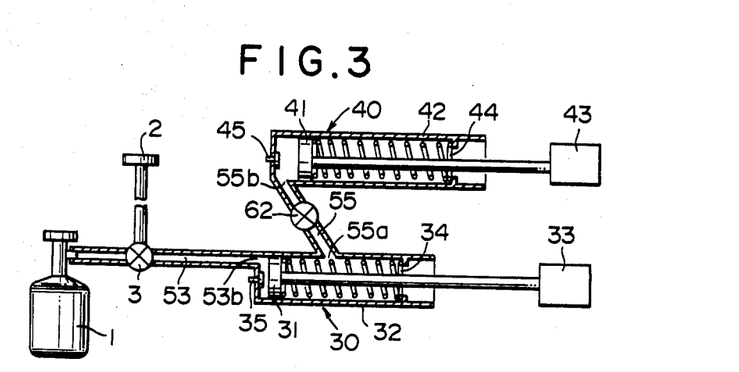

FIGS. 2 and 3 indicate the principle of operation of the third and fourth operating means 30 and 40, wherein those elements corresponding to those shown in FIG. 1 are indicated with the same numerals. FIG. 2 shows the third and fourth operating means 30 and 40 shown above the line II—II in FIG. 1 with the pipe 55 and the valve 62 omitted. For the convenience of explanation, the third operating means 30 is shown to be directly connected with the gas supply means 1 by way of the pipe 53.

Referring to FIG. 2, the two cylinders 32 and 42 are connected with each other by way of a pipe 54 which extends between the head of the third cylinder 32 and the head of the fourth cylinder 42 so that the third and fourth pistons 31 and 41 may be moved to the right simultaneously when the valve 61 is fully opened. When the valve 61 is partially opened, the rate of the gas flow flowing into the third cylinder 32 is larger than that of the gas flow flowing into the fourth cylinder 42, which results in a difference in the speed of movement of the two pistons 31 and 41. By controlling valve 61, the difference between the speed of movement of one piston and the other can be controlled. Since the third piston 31 is connected with a leading blind starting means in the camera and the fourth piston 41 is connected with a trailing blind starting means, the shutter speed can be controlled by controlling the valve 61. Therefore, by interconnecting the valve 61 with a shutter speed dial, the desired shutter speed can be obtained by rotating the dial.

Referring to FIG. 3, two cylinders 32 and 42 are connected with each other by way of a pipe 55 which extends between a side of the third cylinder 32 and the head of the fourth cylinder 42 so that the fourth piston 41 may be moved when the third piston 31 is moved up to the position of the opening of the end 55a of the pipe 55. Thus, the time interval between the start of the third piston and the start of the fourth piston is made longer than that obtained in the case as shown in FIG. 2. Slow shutter speeds can be obtained by this arrangement. By partly closing the valve 62 provided in the pipe 55, further slow shutter speeds can be obtained. Therefore, by selectively opening and closing the valves 61 and 62 provided in the pipes 54 and 55, a variety of shutter speeds can be obtained.

When it is required to delay the start of the shutter operation to synchronize the shutter release with a flash light or the like, a flow control valve can be provided in the pipe 51 or the pipe 53 to control the flow of the gas supplied to the third cylinder 32.

Figure 4:
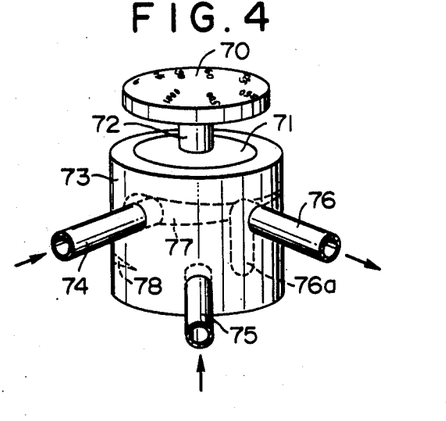
FIG. 4 is a perspective view of an example of a valve employed in the driving device in accordance with the present invention.
Figure 5:
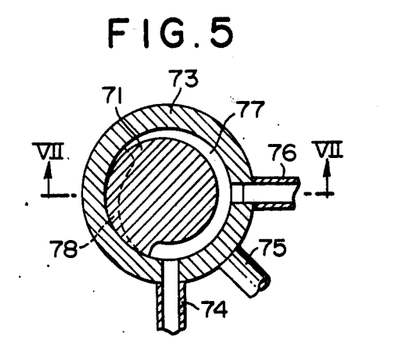
FIG. 5 is a horizontal sectional view of the valve as shown in FIG. 4 taken along the upper groove thereof.
Figure 6:
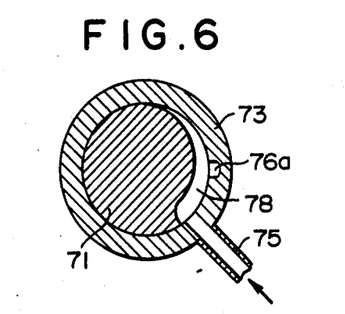
FIG. 6 is a horizontal sectional view of the valve as shown in FIG. 4 taken along the lower groove thereof.
Figure 7:
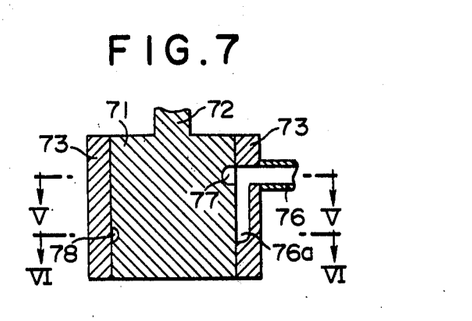
FIG. 7 is a vertical sectional view taken along the line VII—VII of FIG. 5.

In order to selectively open and close the valves 61 and 62, the valves 61 and 62 may be independently operated or operated by use of a single valve control means as shown in FIGS. 4 to 9. The single valve control means shown in FIGS. 4 to 9 is designed to operate the two valves 61 and 62 by simply rotating a shutter speed dial. Referring to FIG. 4, a shutter speed dial 70 is fixed to a valve core 71 by way of a shaft 72. The valve core 71 is mated with and rotatable in a cylinder 73 which has pipes 74, 75 and 76 corresponding to said pipes 54 and 55. The valve core 71 is provided on the outer surface thereof with grooves 77 and 78 the width and depth of which vary from one end to the other thereof. This kind of valve is well known as a cock. Referring to FIGS. 5 to 9, the valve core 71 is provided on the surface thereof with two grooves 77 and 78 at different levels. The upper groove 77 is communicated with an inlet pipe 74 and an outlet pipe 76 for high shutter speed as shown in FIGS. 4 and 5. The lower groove 78 is communicated with an inlet pipe 75 for slow shutter speed and a vertical groove 76a provided on the inner surface of the cylinder 73 which is communicated with said outlet pipe 76 as shown in FIGS. 6 and 7. The inlet pipe 74 and the outlet pipe 76 for high shutter speed correspond to said end 54a and said end 54b of the pipe 54 respectively, and the inlet pipe 75 for slow shutter speed corresponds to said end 55a of the pipe 55. The position of the grooves 77, 78 and 76a, and the pipes 74, 75 and 76 is illustrated in detail in FIGS. 8 and 9.

Figure 8:
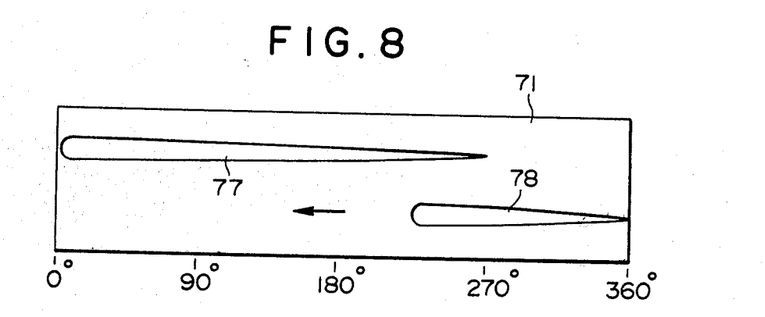
FIG. 8 is a developed view showing the shape of the grooves on the valve core of the valve as shown in FIGS. 4 to 7.
Figure 9:
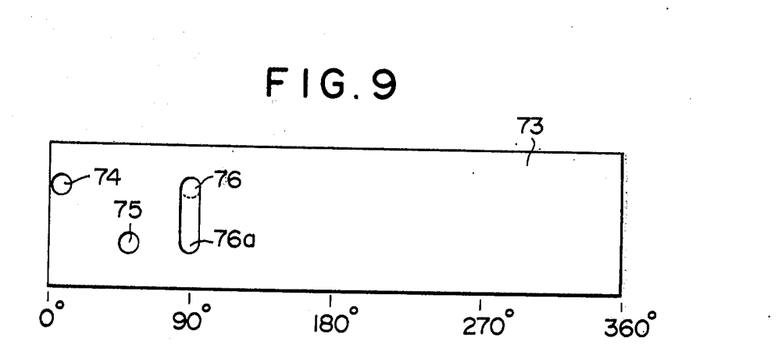
FIG. 9 is a developed view showing the shape of the openings formed on the internal surface of the valve cylinder of the valve as shown in FIGS. 4 to 7.

When the shutter dial 70 is rotated clockwise in FIG. 4, the valve core 71 moves to the left in FIG. 8. Until the valve core 71 moves to the left by 180° from the position indicated in FIG. 8, the upper groove 77 allows gas to flow therethrough from the inlet pipe 74 to the outlet pipe 76 as shown in FIG. 9. The groove 77 corresponds to the pipe 54 with the valve 61. The width and depth of the groove 77 are reduced as the valve core 71 is rotated clockwise (to the left in FIG. 8) to reduce the rate of flow from the inlet 74 to the outlet 76, which results in increase in the difference in time between the start of the third piston 31 and the start of the fourth piston 41, and accordingly, the shutter speed is slowed down. When the rotation of the valve core 71 exceeds 180°, the outlet pipe 76 is separated from the upper groove 77 and the lower groove 78 starts to allow gas to flow therethrough from the inlet pipe 75 to the vertical groove 76a communicated with the outlet pipe 76. Therefore, the valve 61 is closed and the valve 62 is opened in effect. In the embodiment illustrated in FIGS. 4 to 9, the lower groove 78 allows gas to flow while the valve core 71 rotates by 90°. The upper groove 77 makes comparatively high shutter speed and the lower groove 78 makes comparatively slow shutter speed.

When the fourth piston 41 has completed its movement to close the shutter in the camera, valves 15, 25, 35 and 45 provided in the head of the cylinders 12, 22, 32 and 42 respectively are opened to let the gas within the cylinders pass out and allow the pistons 11, 21, 31 and 41 to return to their initial position by the force of the compression springs 14, 24, 34 and 44. The valves 15, 25, 35 and 45 are closed by the returned pistons when the pistons are moved to their leftmost position. Thus, the driving device is reset in the ready position.

Summarizing the above operations, a depression button 2 which is connected with a shutter release button for example is depressed, the gas within the gas cylinder 1 is introduced into the first cylinder 12 by way of the open valve 3 and the pipe 51. By the pressure of the gas introduced into the first cylinder 12, the first piston 11 is moved to the right to swing up the mirror in the camera. When the head of the piston 11 comes to the position of the end 52a of the pipe 52, the gas within the first cylinder 12 is allowed to go into the second cylinder 22 by way of the pipe 52. By the pressure of the gas introduced into the second cylinder 22, the second piston 21 is moved to the right to stop down the diaphragm by the operating lever 23. When the head of the piston 21 comes to the end 53a of the pipe 53, the gas within the second cylinder 22 goes into the third cylinder 32 and pushes the third piston 31 to the right to start the leading shutter blind in the camera by way of the operating lever 33. Then, if the valve 61 is open and the valve 62 is closed to obtain a high shutter speed, the gas which has reached the third cylinder 32 goes into the fourth cylinder 42 by way of the controlled valve 61. In accordance with the degree of control made by the valve 61, the start of the fourth piston 41 is delayed with respect to the start of the third piston 31 to effect a desired shutter speed. If the valve 61 is closed and the valve 62 is opened to obtain a slow shutter speed, the gas within the third cylinder 32 goes into the fourth cylinder 42 when the head of the piston 31 comes to the end 55a of the pipe 55. Therefore, the start of the piston 41 is delayed to a greater extent with respect to the start of the third piston 31.

If it is desired to delay the start of the shutter to a great extent with respect to the control of the diaphragm, a flow control valve may be provided in the pipe 53 connected between the second and third cylinders 22 and 32.

Although in the above described embodiment various camera elements are operated by means of operating levers 13, 23, 33 and 43, these camera elements can be directly connected with the pistons. By directly connecting these camera elements with the pistons, the structure of the camera is much simplified and the size of the camera can be made small. It will also be understood that the shutter which has been described as a focal plane shutter can be a lens shutter. Further, it will be noted by those skilled in the art that various camera elements other than the mirror swinging up means, diaphragm controlling means and shutter operating means can be driven by the device in accordance with the present invention. Further, as set forth hereinbefore, the gas cylinder 1 may be replaced by a pump which is charged to store gas pressure when the film is wound up in the camera.

Figure 10:
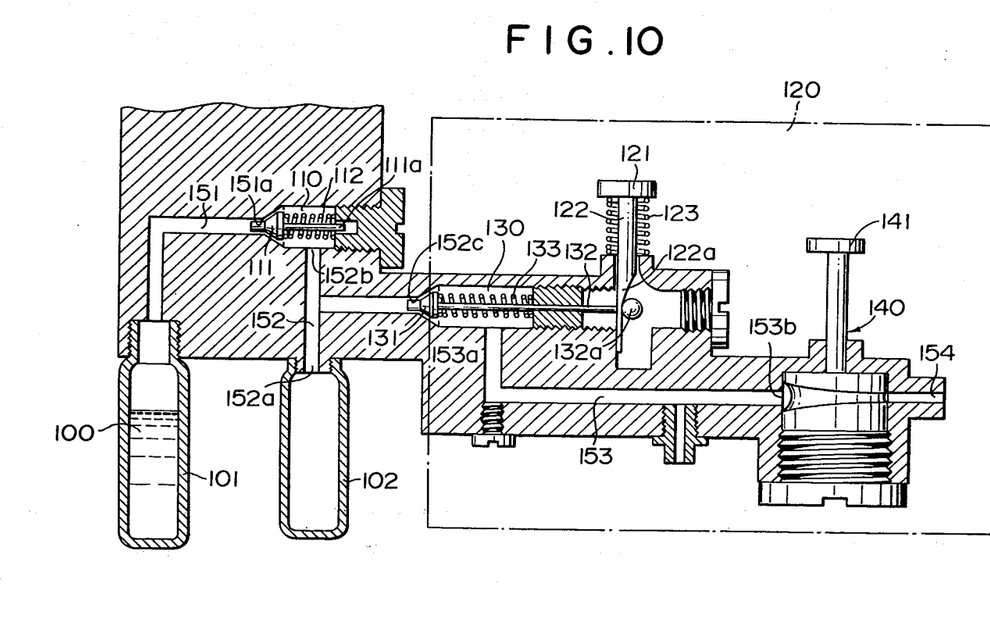
FIG. 10 is a longitudinal sectional view of a control portion of a preferred embodiment of the present invention in which a pressure regulating valve is provided.

Another embodiment of the gas pressure driving device in accordance with the present invention in which a pressure regulating means for regulating the gas pressure supplied to the operating means is provided between a gas cylinder and a gas supply valve is illustrated in FIG. 10. Referring to FIG. 10, a gas cylinder 101 containing a liquefied gas 100 and a subtank 102 are communicated with each other by way of a pressure regulating chamber 110. The pressure regulating chamber 110 is communicated with the gas cylinder 101 and the subtank 102 by way of pipes 151 and 152, respectively. In the pressure regulating chamber 110 is provided a pressure regulating stop valve 111 which is spring urged to the left to close an opening 151a on the left of the chamber 110 by a compression spring 112. When the pressure of the gas within the subtank 102 falls below a predetermined level, the stop valve 111 is moved to the right by the pressure of the gas within the gas cylinder 101 and the pipe 151 and the gas is further supplied to the chamber 110 and the subtank 102. The pipe 152 extending between the chamber 110 and the subtank 102 has a branch open at an end 152c communicated with a gas supply line 120. The pipe 152 thus has three open ends 152a open at the subtank 102, 152b open at the gas pressure regulating chamber 110 and 152c open at the gas supply line 120.

The gas supply line 120 comprises a valve chamber 130 which has a stop valve 131 to open and close said open end 152c of the pipe 152 by the operation of a depression button 121 and a flow control valve 140 which controls the rate of flow through a gas supply pipe 153 extending from said valve chamber 130 by the rotation of a knob 141. The valve chamber 130 into which to one end 152c of the pipe 152 opens is communicated with the flow control valve 140 by way of said pipe 153 which opens at one end 153a thereof in the chamber 130 and at the other end 153b thereof in the flow control valve 140.

The depression button 121 is fixed to the upper end of a rod 122 which has a tapered lower portion 122a and is spring urged upward by means of a compression spring 123 provided around the rod 122. The tapered lower portion 122a of the rod 122 is slidably engaged with an engaging portion 132a fixed to one end of a slim bar 132 the other end of which is fixed to said stop valve 131 so that the stop valve 131 may be moved to the right to open the end 152c when the rod 122 is depressed downward. The structure for moving the stop valve 131 in one direction by depressing a depression button 121 can be replaced by any type of known valve operating mechanism. The stop valve 131 is spring urged to the left by means of a compression spring 133 disposed in the chamber 130 to close the open end 152c so that the valve 131 may close the end 152c when the rod 122 is moved upward by the spring 123 upon release of the button 121.

The flow control valve 140 is provided between said pipe 153 extending from the valve chamber 130 and a pipe 154 communicated with a camera operating means such as said first cylinder 12 in the first embodiment shown in FIG. 1.

In operation of the above described embodiment of the present invention, the stop valve 111 is opened to let the gas within the gas cylinder 101 pass into the subtank 102 when the difference in pressure between the gas within the gas cylinder 101 and the gas within the subtank 102 exceeds a predetermined value. Thus, the pressure of the gas within the subtank 102 is maintained at a proper level with respect to the pressure of the gas within the gas cylinder 101. Further, since the gas is stored in the subtank at a room temperature before it is used for driving the operating means, the volume of the gas reduced owing to vaporization is recovered and accordingly the gas pressure can be effectively utilized. Then, upon depression of the depression button 121, the stop valve 131 is moved to the right to open the end 152c of the pipe 152 to let the gas within the subtank 102 go to the flow control valve 140. Thus, the gas is supplied to the camera operating means (not shown) at a rate determined by the flow control valve 140 by way of the pipe 154.

Figure 11:
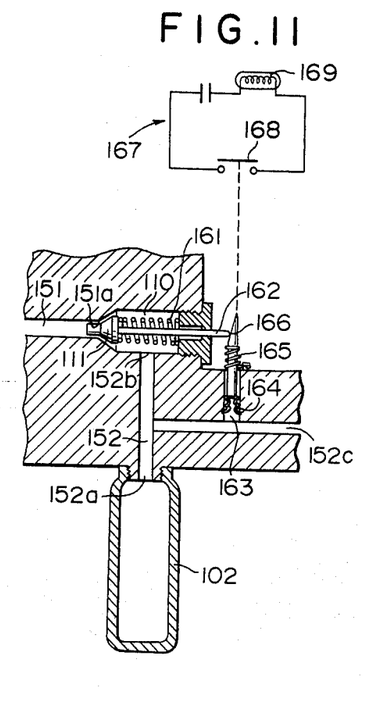
FIG. 11 is a partial sectional view showing an example of pressure regulating means employed in a preferred embodiment of the invention.

In the above described embodiment with reference to FIG. 10, the pressure of the gas within the subtank 102 is regulated only with respect to the pressure of the gas within the gas cylinder 101. In order to regulate the pressure of the gas within the subtank 102 irrespectively of the pressure of the gas within the gas cylinder 101, a pressure regulating means which controls the stroke of the stop valve 111 may be provided as shown in FIG. 11. Referring to FIG. 11 wherein those elements equivalent to those employed in the embodiment shown in FIG. 10 are indicated with the same reference numerals, a stop valve 111 is spring urged to the right to open the end 151a by a tension spring 161 provided in the pressure regulating chamber 110. The stop valve 111 is connected with a rod 162 which projects out of the chamber 110. The pipe 152 is provided with a branch pipe 163 in which bellows 164 is fixed to close the end thereof. The bellows 164 is fixed to a rod 166 having a tapered upper portion and is spring urged downward by means of a spring 165. The position of the stop valve 111 is accordingly controlled by the position of the vertically movable rod 166. When the rod 166 is moved downward, the valve 111 is moved to the right to open the open end 151a of the pipe 151 to let the compressed air in the gas cylinder 101 and the pipe 151 pass into the subtank 102. When the rod 166 is moved upward, the valve 111 is moved to the left to close the open end 151a of the pipe 151. Since the bellows 164 is interposed between the gas within the pipe 152 and the atmosphere, the rod 166 is moved up and down owing to the pressure difference between the gas within the pipe 152 and the atmosphere, that is, irrespectively of the pressure difference between the gas within the pipe 152 and the gas cylinder 101. Further, the rod 166 is connected with a switch 168 of a lamp circuit 167 so that an indicating lamp 169 may be turned on when the pressure of the gas within the subtank 102 falls below a predetermined level and the gas within the gas cylinder 101 is introduced into the subtank 102. Turning off of the indicating lamp 169 indicates that the pressure of the gas within the subtank 102 has recovered to the normal level. If the indicating lamp 169 does not turn off, it is an indication that the pressure of the gas within the gas cylinder 101 is insufficient.

Figure 12:
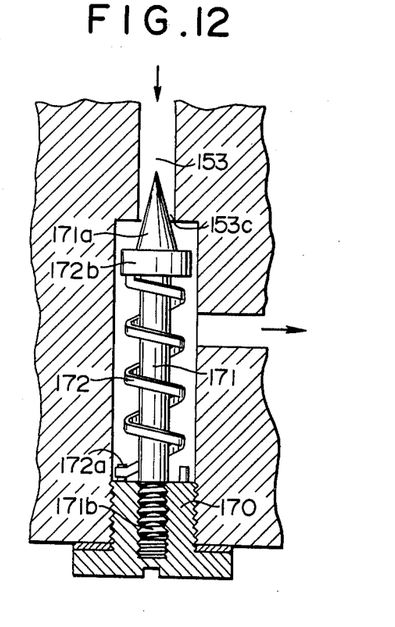
FIG. 12 is a partial sectional view showing an example of temperature compensating means employed in a preferred embodiment of the invention.

In order to effect far more accurate regulation of the pressure of the gas supplied for driving the operating means in the camera, a temperature compensating means as shown in FIG. 12 can be employed. The temperature compensating means is provided for increasing the rate of flow of the gas when the pressure of the gas is reduced by the fall of the temperature and for decreasing the rate of flow of the gas when the pressure of the gas is increased by the rise of the temperature. The temperature compensating means may be provided at any position between the subtank 102 and the camera operating means. In this embodiment, the temperature compensating means is provided in the pipe 153 extending between the valve 130 and the supply valve 140.

Referring to FIG. 12, a flow regulating valve 171 having a tapered top 171a and threaded foot 171b is screwed into a threaded hole in a bottom member 170 fixed to an open end of the pipe 153. The bottom member 170 is fixed to the open end of the pipe 153 to tightly close the open end thereof and supports the flow regulating valve 171 screwed thereto. The pipe 153 is provided with a stepped portion 153c at which the diameter of the pipe 153 discretely increases. Said tapered top 171a is engaged with the stepped portion 153c to control the rate of flow of the gas flowing through the pipe 153 by the vertical movement thereof. The flow regulating valve 171 is provided with a spiral bimetal strip 172 the upper end of which 172b is fixed to a part of the tapered top 171a and the lower end of which 172a is fixed to a part of the bottom member 170. When the temperature rises, the bimetal strip 172 expands and makes the flow regulating valve 171 rotate counterclockwise when viewed from above, which results in upward movement of the valve 171 caused by the screw engagement of the screwed foot 171b with the bottom member 170. When the temperature falls, the bimetal strip 172 shrinks and makes the flow regulating valve 171 rotate clockwise which results in downward movement of the valve 171 by the screw engagement of the screwed foot 171b with the bottom member 170. By the downward movement of the valve 171 caused by the fall of the temperature, the rate of flow of the gas is increased. By the upward movement of the valve 171 caused by the rise of the temperature, the rate of flow of the gas is decreased. Thus, the pressure of the gas supplied to the operating means is accurately regulated with respect to the temperature fluctuation.

I claim:

1. A device for sequentially driving a plurality of operating means in a camera comprising a plurality of operating members connected with operating means in a camera for actuating the same, a plurality of pressure conversion means each including a movable member which convert gas pressure to a movement of the movable member, each said operating member being connected with a movable member so that the operating members are actuated by the pressure of the gas supplied to said pressure conversion means, a gas supply means for supplying a gas to said pressure conversion means, and a flow control means provided between the gas supply means and at least one of said pressure conversion means for controlling the rate of flow of the gas flowing into the pressure conversion means.

2. A device as claimed in claim 1 wherein one of said pressure conversion means is connected in parallel with another pressure conversion means.

3. A device as claimed in claim 2 wherein said pressure conversion means connected in parallel with each other are connected by way of a flow control valve.

4. A device as claimed in claim 1 wherein said pressure conversion means comprises a cylinder and a piston slidably provided therein.

5. A device as claimed in claim 4 wherein a head of a cylinder of one pressure conversion means is connected with a side of a cylinder of another pressure conversion means.

6. A device as claimed in claim 5 wherein the head of a cylinder is connected with the side of a cylinder by way of a flow control valve.

7. A device as claimed in claim 4 wherein a head of a cylinder of one pressure conversion means is connected with a head of a cylinder of another pressure conversion means.

8. A device as claimed in claim 7 wherein said heads are connected with each other by way of a flow control valve.

9. A device as claimed in claim 4 wherein a head of a cylinder of one pressure conversion means is connected with a head and a side of a cylinder of another pressure conversion means by means of two pipes, said pipes being provided with flow control valve respectively.

10. A device as claimed in claim 9 wherein said flow control valves are selectively closed and opened so that only one of the two valves is normally opened.

11. A device as claimed in claim 10 wherein said two valves are comprised of a single cock having two inlets and one outlet, said two inlets being connected with the head and side of one of said cylinders and said outlet being connected with the head of the other of said cylinders.

12. A device as claimed in claim 11 wherein said cock is provided with a valve core to be rotated to change the rate of flow of gas flowing therethrough, said valve core being fixed to a shutter speed dial.

13. A device as claimed in claim 4 wherein a piston of one pressure conversion means is connected with a shutter opening means and a piston of another pressure conversion means is connected with a shutter closing means.

14. A device as claimed in claim 1 wherein a pressure regulating valve means is provided between said gas supply means and said flow control means.

15. A device as claimed in claim 14 wherein said pressure regulating valve means comprises a stop valve chamber formed in a passage from the gas supply means to the flow control means, and a stop valve which is spring urged to close an opening of the chamber.

16. A device as claimed in claim 14 wherein a subtank is provided between the pressure regulating valve and the flow control means for storing a gas therein.

17. A device as claimed in claim 1 wherein a shutter release valve is provided between said gas supply means and said flow control means, said shutter release valve comprising a valve which is opened upon depression of a shutter release button.

18. A device as claimed in claim 17 wherein said flow control means is connected with a shutter speed control means.

19. A device as claimed in claim 17 wherein said flow control means is connected with a diaphragm control means.

20. A device as claimed in claim 1 wherein a temperature compensating means is provided between the gas supply means and said flow control means, said temperature compensating means comprising a valve and a valve seat provided in a passage between the gas supply means and the flow control means, and a temperature sensitive means associated with said valve so that the valve is moved to the seat to narrow the gap between the valve and the valve seat when the temperature rises, and the valve is moved apart from the valve seat to broaden said gap when the temperature falls.

* * * * *